United States Patent
Bhongale et al.

(10) Patent No.: US 10,241,230 B2
(45) Date of Patent: Mar. 26, 2019

(54) DOWNHOLE SENSING USING SOLITONS IN OPTICAL FIBER

(71) Applicant: HALLIBURTON ENERGY SERVICES, INC., Houston, TX (US)

(72) Inventors: Satyan Gopal Bhongale, Cypress, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/329,698

(22) PCT Filed: Jun. 26, 2015

(86) PCT No.: PCT/US2015/038073
§ 371 (c)(1),
(2) Date: Jan. 27, 2017

(87) PCT Pub. No.: WO2016/209279
PCT Pub. Date: Dec. 29, 2016

(65) Prior Publication Data
US 2017/0219736 A1 Aug. 3, 2017

(51) Int. Cl.
*G01V 8/16* (2006.01)
*H04B 10/2507* (2013.01)
(Continued)

(52) U.S. Cl.
CPC ............ *G01V 8/16* (2013.01); *E21B 47/0006* (2013.01); *E21B 47/06* (2013.01); *E21B 47/065* (2013.01);
(Continued)

(58) Field of Classification Search
CPC ......... G01B 11/02; G01B 11/14; G06F 3/017; G06F 3/015; G01C 15/002; G01S 17/023;
(Continued)

(56) References Cited

U.S. PATENT DOCUMENTS

| 6,259,542 B1 * | 7/2001 | Saunders | H04B 10/07 398/110 |
| 6,449,408 B1 * | 9/2002 | Evans | G02F 1/3515 359/334 |

(Continued)

FOREIGN PATENT DOCUMENTS

WO 2009/128977 10/2009

OTHER PUBLICATIONS

PCT International Search Report and Written Opinion, dated Feb. 25, 2016, Appl No. PCT/US2015/038073, "Downhole Sensing Using Solitons in Optical Fiber," Filed Jun. 26, 2015, 14 pgs.
(Continued)

*Primary Examiner* — Sang H Nguyen
(74) *Attorney, Agent, or Firm* — John W. Wustenberg; Parker Justiss, P.C.

(57) ABSTRACT

A downhole sensing method includes modulating light to form a soliton that propagates through an optical fiber acting as a sensing element that measures a downhole parameter. The method further includes obtaining scattered light created as the soliton propagates through the optical fiber. The method further includes determining a value for a downhole parameter based on the scattered light, and displaying a representation of the value.

23 Claims, 4 Drawing Sheets

(51) Int. Cl.
*H01S 3/30* (2006.01)
*E21B 47/06* (2012.01)
*E21B 47/00* (2012.01)
*E21B 47/10* (2012.01)
*E21B 47/12* (2012.01)

(52) U.S. Cl.
CPC .......... *E21B 47/102* (2013.01); *E21B 47/123* (2013.01); *H01S 3/302* (2013.01); *H04B 10/25077* (2013.01); *H01S 2301/085* (2013.01)

(58) Field of Classification Search
CPC ..... G01S 17/66; G06T 7/0097; G06T 7/0083; G06T 2207/30196; G06T 2207/20224
See application file for complete search history.

(56) References Cited

U.S. PATENT DOCUMENTS

| | | | | |
|---|---|---|---|---|
| 6,476,959 | B2* | 11/2002 | Yao | H01S 3/302 359/334 |
| 6,618,531 | B1* | 9/2003 | Goto | G02F 1/3513 359/327 |
| 6,816,515 | B1* | 11/2004 | Yun | H01S 3/1112 372/18 |
| 7,254,289 | B2 | 8/2007 | Wait et al. | |
| 9,546,548 | B2* | 1/2017 | Hartog | E21B 47/101 |
| 9,575,209 | B2* | 2/2017 | Samson | E21B 47/123 |
| 9,702,244 | B2* | 7/2017 | Willis | E21B 47/14 |
| 2003/0043451 | A1* | 3/2003 | Kato | G02F 1/353 359/326 |
| 2007/0215816 | A1* | 9/2007 | Hui | G01N 21/6458 250/458.1 |
| 2009/0107558 | A1* | 4/2009 | Quigley | F16L 11/12 137/15.01 |
| 2010/0207019 | A1* | 8/2010 | Hartog | E21B 47/101 250/269.1 |
| 2012/0060615 | A1* | 3/2012 | Farhadiroushan | G01D 5/35303 73/655 |
| 2013/0021874 | A1* | 1/2013 | Hartog | E21B 47/101 367/31 |
| 2013/0061688 | A1 | 3/2013 | Hayward | |
| 2013/0070235 | A1* | 3/2013 | Chen | G01L 11/025 356/73 |
| 2013/0219997 | A1* | 8/2013 | Sullivan | E21B 49/10 73/53.01 |
| 2013/0236153 | A1* | 9/2013 | Rochette | G02B 6/2552 385/146 |
| 2014/0036939 | A1* | 2/2014 | Fermann | H01S 3/06754 372/18 |
| 2014/0285795 | A1* | 9/2014 | Jaaskelainen | E21B 47/123 356/73.1 |
| 2015/0055666 | A1 | 2/2015 | Reid et al. | |
| 2015/0369742 | A1* | 12/2015 | Tamada | G01N 21/65 356/301 |

OTHER PUBLICATIONS

Kath, Bonnie et al., "Making Waves: Solitons and Their Optical Applications," SIAM News, Mar. 8, 1998, 5 pgs., vol. 31, No. 2.
Gedalin, M. et al., "Optical Solitons in the Higher Order Nonlinear Schrodinger Equation," Phys. Rev. Lett., 78, 448-451, 1997.

\* cited by examiner

DOWNHOLE SENSING USING SOLITONS IN OPTICAL FIBER

BACKGROUND

In the oil and gas industry, optical fibers are increasingly being employed in sensing systems. Based on the topology and configuration of the system, fiber-optic sensors can be single-point, multi-point, or distributed sensors. In a single-point sensor, the sensing element is typically located at the tip of the fiber, but in some cases can be located at any single point in the fiber. In a multi-point sensor, two or more sensing elements are included at specific locations of the fiber. Depending upon the application for which the sensing system is employed, the two or more sensing elements may be physically near or far from one another. In a distributed sensor, the sensing element includes the entire length of the fiber, i.e., the whole fiber acts as a sensor.

One application that uses a distributed sensor is distributed acoustic sensing (DAS), which provides near real-time measurements over the entire length of the optical fiber. As such, DAS may be implemented for pipeline monitoring purposes to measure flow, seismic signals, and leak indicators. Unlike single or multi-point sensors, a distributed sensor provides thousands of sensing points along a single optical fiber.

As a signal traverses optical fiber, the signal suffers from increased attenuation as the length of the fiber increases. Although higher power sources may be used to counteract the attenuation, this approach increases undesirable non-linear effects in the fiber. Additionally, the signal is subject to dispersion, which is a widening of the signal as the length of the fiber increases such that subsequent signals may overlap. The overlapping of signals decreases the information rate of which the fiber is capable. Thus, the dispersion along with nonlinear effects places a maximum limit on the length of the optical fiber that may be used in many applications. Such a maximum limit is particularly detrimental to distributed sensing as thousands of potential sensing points are sacrificed.

BRIEF DESCRIPTION OF THE DRAWINGS

Accordingly, systems and methods of downhole sensing using solitons in optical fiber are disclosed. In the following detailed description of the various disclosed embodiments, reference will be made to the accompanying drawings in which.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods of downhole sensing using solitons in optical fiber. A soliton or solitary wave is a stable traveling wave that balances or cancels dispersion effects with nonlinear effects. When moving at a constant speed, a soliton maintains its shape, and solitons passing through one another emerge unmodified. Accordingly, a soliton traveling through optical fiber will not suffer from dispersion, and dispersion will not limit the length of optical fiber used for downhole applications, which may be performed thousands of feet below the Earth's surface.

Figures 1, 2:
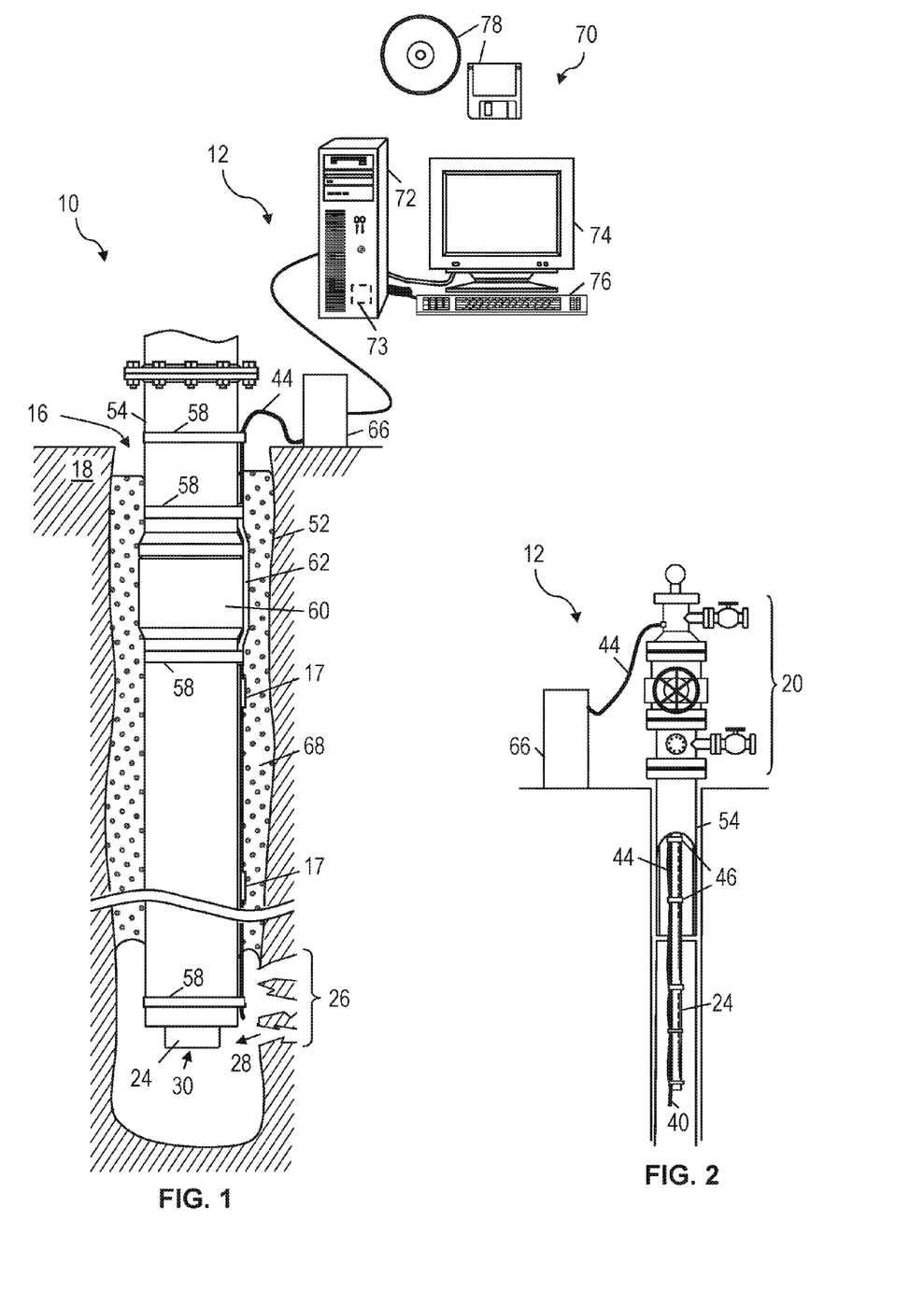
FIG. 1 is a contextual view of an illustrative downhole distributed sensing environment.
FIG. 2 is a contextual view of an illustrative production environment.

The disclosed systems and methods for using such solitons are best understood in terms of the context in which they are employed. As such, FIG. 1 is a contextual view of an illustrative distributed sensing environment including a well 10 equipped with a downhole optical sensor system 12. A drilling rig has been used to drill and complete the well 10 with a casing string 54 positioned in the borehole 16 that penetrates into the earth 18. The casing string 54 includes multiple tubular casing sections (usually about 30 feet long) connected end-to-end by couplings 60 (FIG. 1 is not to scale. Typically the casing string includes many such couplings). Within the well 10, a cement slurry 68 has been injected into the annular space between the outer surface of the casing string 54 and the inner surface 52 of the borehole 16 and allowed to set. A production tubing string 24 has been positioned in an inner bore of the casing string 54. The well 10 is adapted to guide a desired fluid (e.g., oil or gas) from the bottom of the borehole 16 to the surface of the Earth 18. Perforations 26 have been formed at a bottom of the borehole 16 to facilitate the flow of a fluid 28 from a surrounding formation into the borehole and thence to the surface via an opening 30 at the bottom of the production tubing string 24.

The downhole sensor system 12 includes an interface 66 coupled to an optical fiber 44 for distributed downhole sensing. The interface 66 is located on the surface of the Earth near the wellhead, i.e. a "surface interface." The fiber 44 extends along an outer surface of the casing string 54 and is held against the outer surface of the casing string 54 at spaced apart locations by multiple bands 58 that extend around the casing string 54. A protective covering 62 may be installed over the fiber 44 at each of the couplings 60 of the casing string 54 to prevent the fiber 44 from being pinched or sheared by the coupling's contact with the borehole wall. The protective covering 62 may be held in place, for example, by two of the bands 58 installed on either side of coupling 60. Amplifiers 17 may be coupled to the fiber-optic cable 44 at various positions in order to increase or maintain signal power.

The system 12 further includes a computer 70 coupled to the surface interface 66. The computer 70 and/or the surface interface 66 include a processing unit, such as a processor coupled to memory, to execute various processes described in this disclosure such as determining and outputting downhole parameter values. The illustrated computer 70 includes a chassis 72, an output device 74 (e.g., a monitor as shown in FIG. 1, or a printer), an input device 76 (e.g., a keyboard or pointing device), a processor, memory, and non-transient information storage media 78 (e.g., magnetic or optical data storage disks) including software that, when executed, causes a processor to perform various processes described in this disclosure.

The computer may be implemented in different forms including, e.g., an embedded computer permanently installed as part of the surface interface 66, a portable computer that is plugged into or wirelessly linked to the surface interface 66 as desired to collect data, and a remote desktop computer coupled to the surface interface 66 via a wireless link and/or a wired computer network. The computer 70 is adapted to receive electrical measurement signals produced by the surface interface 66 and to responsively determine a downhole parameter such as temperature, pressure, strain, and resistivity. In at least some implementations, the non-transient information storage media 78 stores a software program for execution by the computer 70, specifically a processor included in the computer 70. The instructions of the software program may also cause the computer 70 to display information associated with determine downhole parameter values via the output device 74.

FIG. 2 is a contextual view of an illustrative production environment including the downhole optical sensor system 12 having the optical fiber 44 strapped to the outside of the production tubing 24 rather than the outside of casing 54. The fiber 44 extends along the outer surface of the production tubing string 24 and is held against the outer surface of the of the production tubing string 24 at spaced apart locations by multiple bands 46 that extend around the production tubing string 24. The system 12 of FIG. 2 optionally includes a hanging tail 40 at the bottom of the borehole. In other embodiments, the fiber 44 is suspended inside the production tubing 24 and held in place by a suspended weight on the end of the fiber 44. Rather than exiting the well from the annular space outside of the casing 54, the fiber 44 exits through an appropriate port in the "Christmas tree" 20, i.e., the assembly of pipes, valves, spools, and fittings connected to the top of the well to direct and control the flow of fluids to and from the well. Outside of the Christmas tree, the fiber 44 is coupled to the surface interface 66.

Figure 3:
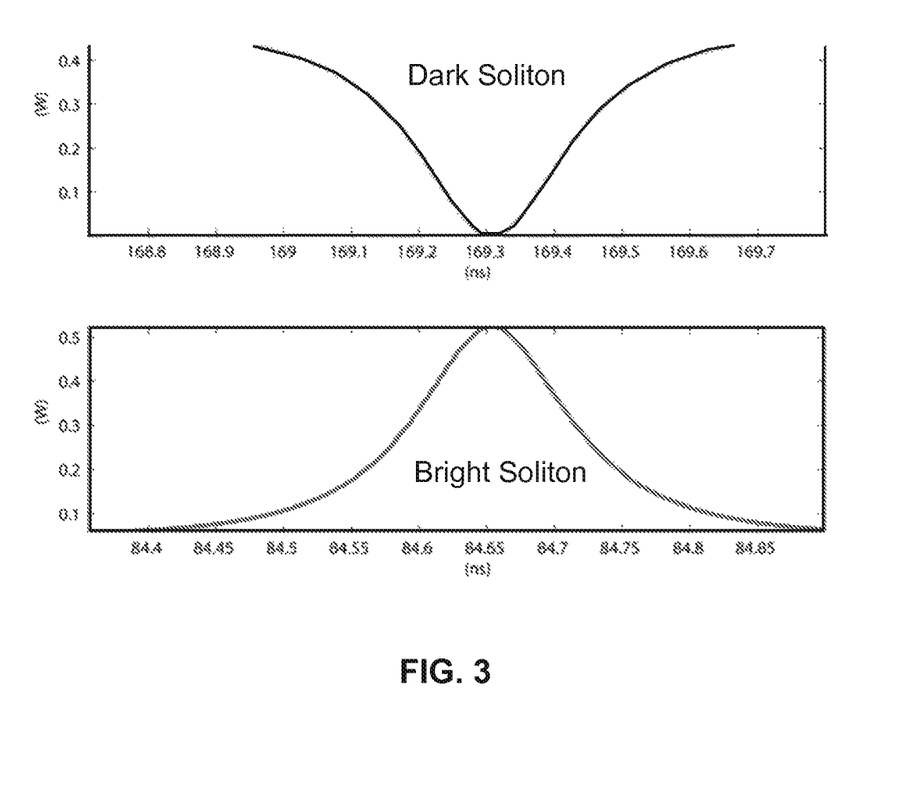
FIG. 3 shows graphs of the power of an illustrative dark and bright soliton over time.

FIG. 3 shows graphs of the power, in watts, of an illustrative dark and bright soliton as a function of time, in nanoseconds. As discussed above, a soliton is a stable traveling wave that balances or cancels dispersion effects with nonlinear effects. A description of how light propagates through fiber will be helpful in describing the dark and bright soliton. Light propagates through a fiber in accordance with the following equation.

$$i\frac{\partial a}{\partial z} + i\beta_1 \frac{\partial a}{\partial t} - \frac{\beta_2}{2}\frac{\partial^2 a}{\partial t^2} + \frac{1}{L_{nl}}|a|^2 a = 0 \quad (1)$$

The term $$i\frac{\partial a}{\partial z}$$

represents the pulse propagation along fiber, $$i\beta_1 \frac{\partial a}{\partial t}$$

represents the free evolution of the pulse in time, $$\frac{\beta_2}{2}\frac{\partial^2 a}{\partial t^2}$$

represents dispersion, and $$\frac{1}{L_{nl}}|a|^2 a$$

represents nonlinearity. For $\beta_2 < 0$, the first order solution to equation (1) describes a bright soliton illustrated in the lower portion of FIG. 3.

$$a(\tau, \varsigma) = sech(\tau)e^{i\varsigma/2} \quad (2)$$

For $\beta_2 > 0$, the first order solution to equation (1) describes a dark soliton illustrated in the upper portion of FIG. 3.

$$a(\tau, \varsigma) = \tan h(\tau)e^{i\varsigma} \quad (3)$$

In either case, the dispersion term of equation (1), $$\frac{\beta_2}{2}\frac{\partial^2 a}{\partial t^2},$$

is substantially or completely canceled by the nonlinearity term of equation (1), $$\frac{1}{L_{nl}}|a|^2 a.$$

As illustrated, the profile of the bright soliton is Gaussian with a peak power of about 0.5 W and standard deviation of less than 1 ns, while the dark soliton has an inverted shape with a bottom power approaching 0 W. The solitons may be used in a downhole fiber-optic sensing system as described below.

Figure 4:
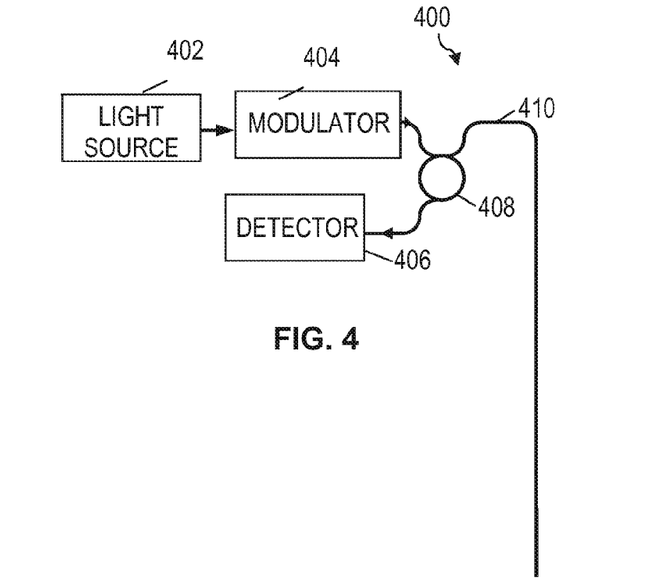
FIG. 4 is diagram of an illustrative distributed sensing system.

FIG. 4 is diagram of an illustrative distributed fiber-optic sensing system 400. The system 400 includes a light source 402, a modulator 404, a detector 406, a circulator 408, and a fiber-optic cable 410. The light source 402, e.g. a laser device, generates photons, e.g. laser energy pulses, and outputs them to the modulator 404. The modulator 404 receives the pulses as input and modulates or shapes them to form solitons. Specifically, one or more of the intensity, phase, polarization, and frequency of the pulses may be modulated to substantially cancel predicted dispersion with non-linear effects.

The modulator 404 outputs the solitons to the circulator 408, which receives the solitons as input and routes the solitons to the fiber-optic cable 410. The circulator 408 may be a three-port device that enables light travel in only one direction (e.g. clockwise as shown in FIG. 4). A signal entering the first port exits the second port with minimal loss, while a signal entering the second port exits the third port with minimal loss. However, a signal entering the second port experiences a large amount of loss at the first port, and a signal entering the third port experiences a large amount of loss at the second and third ports. For example, the first port may couple the modulator 404 to the circulator 408, the second port may couple the circulator 408 to the fiber-optic cable 410, and the third port may couple the fiber-optic cable 410 to the detector 406.

As solitons propagate along the cable 410, scattering occurs and scattered light is directed by the circulator 408 to the detector 406. Different types of scattering mechanisms include Rayleigh, Brillouin, and Raman scattering. Rayleigh scattering is caused by density and composition fluctuations created in the fiber during the manufacturing process that cause variations in the index of refraction of the fiber. The detector 406 measures the intensity of the scattered light as a function of time after transmission of the laser pulse. Such measurement is sensitive to both strain and temperature variations of the fiber. Dynamic vibration and acoustics can be sensed with interferometric techniques such as Coherent Rayleigh scattering.

Raman scattering is caused by molecular vibration effects of the fiber on the incident light. Raman-scattered light has two sideband wavelength components, one on either side of the main wavelength, called Stokes and anti-Stokes. The ratio between the Stokes and anti-Stokes wavelength measures temperature. The system 400 may include one or more amplifiers, coupled to the cable 410 or fibers, that amplify the soliton during propagation such as a Raman amplifier. A Raman amplifier is an optical amplifier based on Raman gain, which results from the effect of stimulated Raman scattering. Specifically, an input signal can be amplified with a pump beam, the wavelength of which is typically a few tens of nanometers shorter than the input signal.

Finally, Brillouin scattering is caused by acoustic vibration effects of the fiber on the incident light. To satisfy the requirement of energy conservation in light of the vibrations, there is a frequency shift between the soliton frequency and the Brillouin-scattered light. This frequency shift is sensitive to temperature and strain, and can be compared to the Raman scattering, which is only related to temperature.

The detector 406 measures the above attributes of scattered light corresponding to different points along the cable 410. A processor within the detector or coupled to the detector determines the values of downhole parameters as a function of position along the cable 410, and hence different positions along a borehole as part of a downhole sensing system, based on such measurements.

Figures 5, 6:
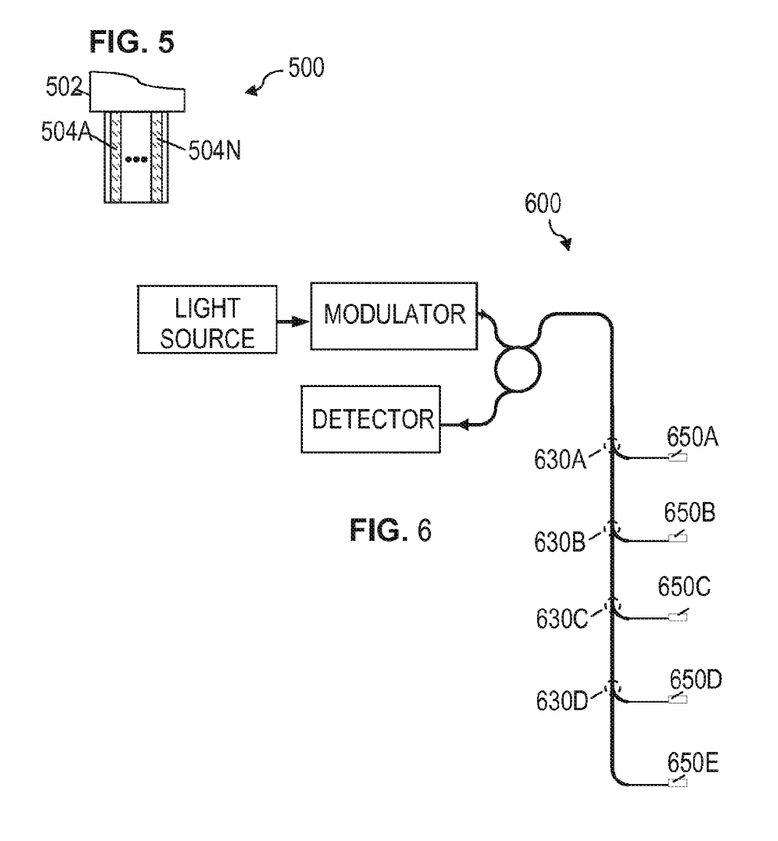
FIG. 5 is a diagram of an illustrative fiber-optic cable.
FIG. 6 is diagram of an illustrative point sensing system.

Turning to FIG. 5, a diagram of an illustrative fiber-optic cable 500 is shown. The cable 500 includes an outer sheath 502 for insulation and/or protection. Within the outer sheath 502, a plurality of optical fibers 504A-504N extend along the length of the cable 500. The number of fibers 504A-504N may vary. Different fibers 504A-504N may be used for different purposes, e.g. some fibers for downward or downhole transmissions and some fibers for upward or uphole transmissions. Some fibers 504A-504N may be used for downhole sensing applications such as sensing pressure, temperature, strain, and/or resistivity. In at least one embodiment, the fibers 504A-504N are positive dispersion fibers, i.e., the fibers 504A-504N have a positive group delay dispersion parameter. In another embodiment, the fibers 504A-504N are negative dispersion fibers, i.e., the fibers 504A-504N have a negative group delay dispersion parameter. In yet other embodiments, the fibers 504A-504N are a mix of positive and negative dispersion fibers. Alternatively, custom fiber can be drawn from a parent glass preform containing alternating waveguide properties, thus resulting in an "alternating dispersion fiber". The cable 500 may be used in a point sensing system.

FIG. 6 is diagram of an illustrative point sensing system 600. In addition to the light source, modulator, detector, fiber-optic cable, and circulator discussed with respect to FIG. 4, the system 600 includes point sensors 650A-E at the tips of the fiber and optical switches 630A-D coupled to the fiber. Unlike a distributed sensing system, the point sensing system measures downhole parameters at the location of the point sensors 650A-E. The configuration of optical switches 630A-D determines which point sensor 650A-E each soliton is directed towards. For example, if switch 630B is closed while switches 630A, 630C, and 630D are open, then a soliton will be directed toward point sensor 650B. If all the switches 630A-D are open, then a soliton will be directed toward point sensor 650E. Each of the point sensors 650A-E may correspond to different downhole zones, and each of the point sensors 650A-E may operate in different wavelength bands for unique identification. Where the fiber-optic cable includes multiple fibers, the point sensors 650A-E can be directly coupled to different fibers.

Different point sensors can be based on underlying concepts such as fiber Bragg gratings (FBG), Fabry-Perot cavities (FP), and micro-electrical mechanical systems (MEMS). A Bragg grating structure is produced in the core of a germanosilicate-made optical fiber by inducing a periodic index change by an argon-ion laser. The FP sensors are usually fabricated using air-glass reflectors, in-fiber Bragg gratings, or through semi-reflective splices. For example, a FP cavity is constructed by aligning two fiber endfaces in a hollow-core fiber in an extrinsic configuration. In at least one embodiment, the two end faces are optically polished and coated with a multilayer of dielectric films. In another embodiment, a pair of low reflection Bragg gratings are holographically written with a time-division multiplexing (TDM) technique. A MEMS-based sensor may employ a structure with an air-backed silicon membrane crossaxially bonded to a 45° polished optical fiber. This structure renders two cascaded FP cavities, enabling simultaneous pressure and temperature sensing in close proximity along the optical axis. These different structures and concepts allow the point sensors to be sensitive to temperature, vibration, acoustic waves, pressure, strain, electric fields, magnetic fields, and resistivity.

Figure 7:
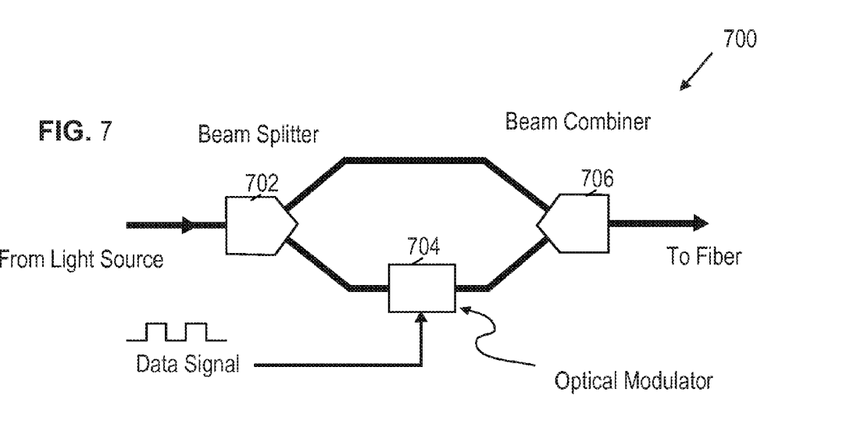
FIG. 7 is a diagram of illustrative modulation equipment.

FIG. 7 is a diagram of illustrative modulation equipment 700 that may be included in the modulator described with respect to FIGS. 4 and 6. The modulation equipment includes a beam splitter 702, an optical modulator 704, and a beam combiner 706. A continuous laser generated by the light source may be input into the beam splitter 702, which splits the laser and routes the laser into two paths. One path leads to an optical modulator 704 followed by the beam combiner 706, while the other path leads directly to the beam combiner 706. The optical modulator may adjust the amplitude, phase, polarization, or frequency of the laser to form a soliton. If a 180 degree phase shift is introduced to the laser by the optical modulator 704, the combiner 706 will cancel the shifted laser with the non-shifted laser. In this way, soliton pulses may be formed based on intermittent canceling of a continuous laser source.

Figure 8:
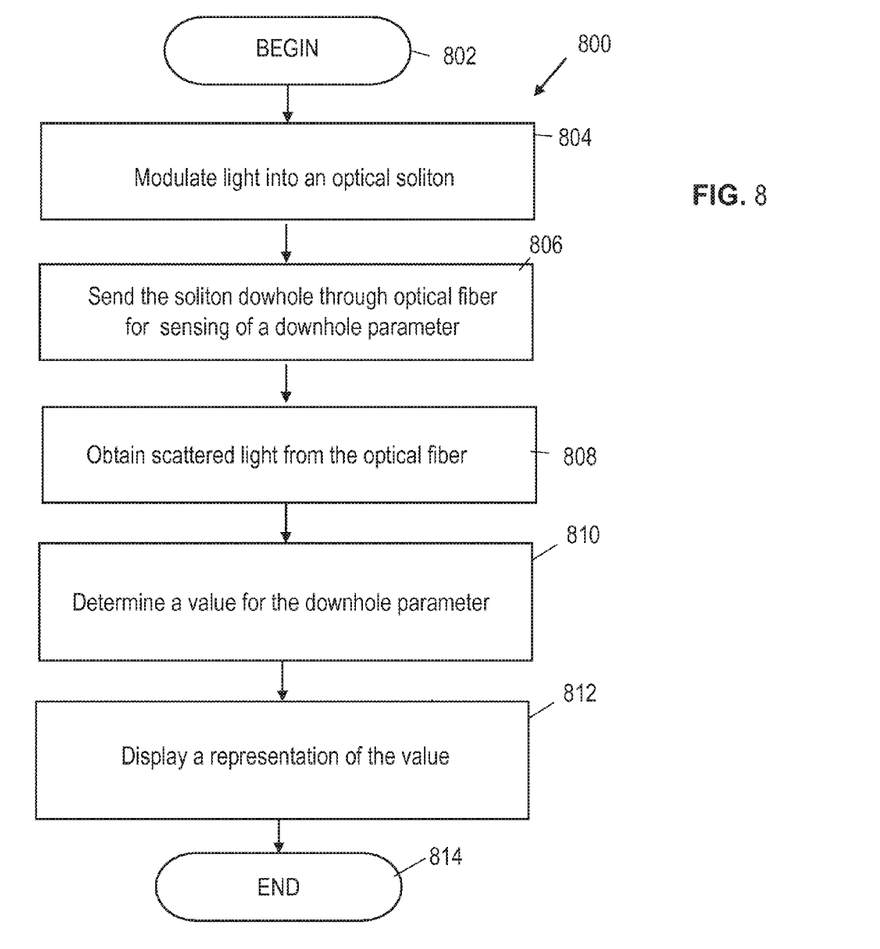
FIG. 8 is a flow diagram of an illustrative method of downhole distributed sensing using optical fiber solitons.

FIG. 8 is a flow diagram of an illustrative method 800 of downhole sensing using solitons beginning at 802 and ending at 814. At 804, light is modulated to form a soliton that propagates through an optical fiber. Modulating the light signal may include adjusting the amplitude, phase, polarization, or frequency of the light signal to substantially cancel predicted dispersion with non-linear effects and thus form a soliton as described with respect to equations (1), (2), and (3).

At 806, the soliton is sent downhole through optical fiber for sensing of a downhole parameter. In a distributed sensing system, the fiber acts as a sensing element that measures a downhole parameter such as temperature, strain, pressure, and the like. In a point sensing system, the fiber is coupled to point sensors that measure the downhole parameters. As the soliton propagates through the fiber, the soliton may be amplified, e.g. using a Raman amplifier, at one or more points.

At 808, scattered light is obtained from the optical fiber. Specifically, propagation of the soliton through the fiber results in scattered light that can be detected and measured. For example, the optical fiber may include an interferometer and the scattered light may be obtained by interferometric sensing. An interferometer uses the interference between two beams that have propagated through different optical paths of a single fiber or two different fibers. One of the optical paths is arranged to be easily affected by external perturbations. Because the interferometers give temporal and spectral information as their signal, the measured properties can be quantitatively determined by various means of detecting the changes in the wavelength, phase, intensity, frequency, bandwidth, and the like.

At 810, a value is determined for the downhole parameter based on the scattered light. Specifically, variations in the characteristics of the scattered light such as intensity and propagation time correspond to measureable variations in the downhole parameters. At 812, a representation of the value is displayed. Displaying the value may include using a printer or display to output the value to a user in a log, table, graph, or the like.

A downhole sensing method includes modulating a light signal to form a soliton that propagates through an optical fiber that acts as a sensing element that measures a downhole parameter. The method further includes obtaining a scattered light signal from the optical fiber. The method further includes determining a value for the downhole parameter based on the scattered light signal and displaying a representation of the value.

The method may also include amplifying the soliton at a point during propagation through the optical fiber. Amplifying the soliton may include performing Raman amplification. Modulating the light signal may include shaping the light signal to substantially cancel predicted dispersion with non-linear effects. Modulating the light signal may include modulating the amplitude and phase of the light signal. The downhole parameter may be temperature, strain, pressure, or resistivity.

A downhole sensing system includes modulation equipment that modulates a light signal to form a soliton. The system further includes an optical fiber, coupled to the modulation equipment, that acts as a sensing element that measures a downhole parameter using the soliton. The system further includes a processing unit, coupled to the optical fiber, that determines a value for the downhole parameter based on a scattered light signal obtained from the optical fiber.

The optical fiber may be attached to a tubular pipe. The system may include an amplifier, coupled to the optical fiber, that amplifies the soliton during propagation through the optical fiber. The amplifier may be a Raman amplifier. The modulation equipment may shape the light signal to substantially cancel predicted dispersion with non-linear effects. The system may include point sensors coupled to the optical fiber and switches coupled to the optical fiber, wherein the configuration of switches determines which point sensor the soliton is directed towards. The downhole parameter may be temperature, strain, pressure, or resistivity.

While the present disclosure has been described with respect to a limited number of embodiments, those skilled in the art will appreciate numerous modifications and variations therefrom. It is intended that the appended claims cover all such modifications and variations.

What is claimed is:

1. A downhole sensing method, comprising:
   generating light from a light source;
   modulating, by a modulator, the light to form a soliton that propagates through an optical fiber extending within a borehole and acting as a sensing element that measures a downhole parameter of the borehole;
   detecting, by a detector, Rayleigh and either Raman or Brillouin scattered light created as the soliton propagates through the optical fiber;
   determining, by a processing unit, a value for the downhole parameter based on the scattered light; and
   displaying, on a display, a representation of the value.

2. The method of claim 1, further comprising amplifying the soliton during propagation through the optical fiber.

3. The method of claim 2, wherein amplifying the soliton comprises performing Raman amplification.

4. The method of claim 1, wherein the scattered light is obtained through interferometric sensing.

5. The method of claim 1, wherein the optical fiber comprises an interferometer.

6. The method of claim 1, wherein the downhole parameter is temperature.

7. The method of claim 1, wherein the downhole parameter is strain.

8. The method of claim 1, wherein the downhole parameter is pressure.

9. The method of claim 1 wherein the detecting only detects Raman or Brillouin scattered light created by the soliton propagating through the optical fiber.

10. A downhole sensing system, comprising:
    a light source that generates light;
    modulation equipment that modulates the light to form a soliton;
    optical fiber extended in a borehole and coupled to the modulation equipment;
    a detector that detects Rayleigh and either Raman or Brillouin scattered light created by the soliton propagating through the optical fiber; and
    a processing unit, coupled to the optical fiber, that determines a value for a downhole parameter of the borehole based on the scattered light created as the soliton propagates through the optical fiber.

11. The system of claim 10, wherein the modulation equipment comprises a beam splitter, an optical switch, and a beam combiner.

12. The system of claim 10, wherein the optical fiber is attached to a tubular pipe.

13. The system of claim 10 further comprising an amplifier, coupled to the optical fiber, that amplifies the soliton during propagation through the optical fiber.

14. The system of claim 13, wherein the amplifier is a Raman amplifier.

15. The system of claim 10, wherein the optical fiber is included in an interferometric sensing system.

16. The system of claim 10, further comprising point sensors coupled to the optical fiber and switches coupled to the optical fiber, wherein the states of the switches determines which point sensor the soliton is directed towards.

17. The system of claim 10, wherein the downhole parameter is temperature.

18. The system of claim 10, wherein the downhole parameter is strain.

19. The system of claim 10, wherein the downhole parameter is pressure.

20. The system of claim 10 wherein the detector only detects Raman or Brillouin scattered light created by the soliton propagating through the optical fiber.

21. A downhole sensing system, comprising:
a light source that generates light;
modulation equipment that modulates the light to form a soliton;
optical fiber extended in a borehole and coupled to the modulation equipment;
point sensors coupled to the optical fiber;
a detector that detects Rayleigh and either Raman or Brillouin scattered light created by the soliton propagating through the optical fiber; and
a processing unit, coupled to the detector that determines a value for a downhole parameter of the borehole at a location of at least one point sensor, wherein the processing unit determines the value based on the scattered light.

22. The system of claim 21, further comprising switches, coupled to the optical fiber, the configuration of which determines which point sensor the soliton is directed towards.

23. The system of claim 21 wherein the detector only detects Raman or Brillouin scattered light created by the soliton propagating through the optical fiber.

* * * * *